(12) United States Patent
Etzel et al.

(10) Patent No.: US 10,595,200 B2
(45) Date of Patent: Mar. 17, 2020

(54) SECURE VEHICLE COMMUNICATION SYSTEM

(71) Applicant: OnBoard Security, Inc., San Diego, CA (US)

(72) Inventors: Mark Howard Etzel, Harvard, MA (US); James Patrick Coleman, Burlington, MA (US); Christopher Lee Savina, Londonderry, NH (US); Michael Twomey Cox, Andover, MA (US)

(73) Assignee: OnBoard Security, Inc., San Diego, CA (US)

( * ) Notice: Subject to any disclaimer, the term of this patent is extended or adjusted under 35 U.S.C. 154(b) by 61 days.

(21) Appl. No.: 15/381,922

(22) Filed: Dec. 16, 2016

(65) Prior Publication Data

US 2017/0180989 A1 Jun. 22, 2017

Related U.S. Application Data

(60) Provisional application No. 62/268,834, filed on Dec. 17, 2015.

(51) Int. Cl.
*H04L 9/08* (2006.01)
*H04W 12/06* (2009.01)
(Continued)

(52) U.S. Cl.
CPC .......... *H04W 12/06* (2013.01); *G06F 21/602* (2013.01); *H04L 9/088* (2013.01); *H04L 9/3268* (2013.01);
(Continued)

(58) Field of Classification Search
CPC ....... H04W 12/06; H04W 4/44; H04W 12/04; H04L 69/22; H04L 9/088; H04L 67/12;
(Continued)

(56) References Cited

U.S. PATENT DOCUMENTS

| | | | | |
|---|---|---|---|---|
| 8,718,797 B1* | 5/2014 | Addepalli | ............. | H04W 4/046 700/17 |
| 2005/0076066 A1* | 4/2005 | Stakutis | ................... | G06F 16/10 |

(Continued)

FOREIGN PATENT DOCUMENTS

WO 2008/009880 A1 1/2008

OTHER PUBLICATIONS

Invitation to Restrict or Pay Additional Fees, and, Whereapplicable, Protest Fee, PCT/US2016/067261, dated Dec. 19, 2017, 4 pages.
(Continued)

*Primary Examiner* — Meng Li
(74) *Attorney, Agent, or Firm* — Kilpatrick Townsend & Stockton

(57) ABSTRACT

A secure vehicle communication system relies on credentials to provide security. A credential includes a private key and a digital certificate. A generic credential file format that is generalized to hold information from multiple credential file formats is provided. Various optimizations enhance the efficiency of the security system, keys may be pre-derived to reduce latency and digital certificates may be sorted and pre-loaded to reduce start-up time. An API may be provided to provide a common interface that abstracts away hardware dependency of secure hardware.

6 Claims, 14 Drawing Sheets

(51) Int. Cl.
  *H04W 12/04* (2009.01)
  *G06F 21/60* (2013.01)
  *H04W 4/40* (2018.01)
  *H04L 9/32* (2006.01)
  *H04L 29/08* (2006.01)
  *H04L 29/06* (2006.01)
  *H04W 4/44* (2018.01)

(52) U.S. Cl.
  CPC .............. *H04L 67/12* (2013.01); *H04L 69/22* (2013.01); *H04W 4/40* (2018.02); *H04W 4/44* (2018.02); *H04W 12/04* (2013.01); *H04L 2209/84* (2013.01)

(58) Field of Classification Search
  CPC .. H04L 9/3268; H04L 2209/84; G06F 21/602
  See application file for complete search history.

(56) References Cited

U.S. PATENT DOCUMENTS

| | | | |
|---|---|---|---|
| 2007/0223702 A1 | 9/2007 | Tengler et al. | |
| 2007/0234045 A1* | 10/2007 | Ishiyama | H04L 63/0823 713/158 |
| 2009/0235071 A1 | 9/2009 | Bellur et al. | |
| 2010/0202616 A1 | 8/2010 | Peirce et al. | |
| 2015/0256348 A1 | 9/2015 | Tschache | |

OTHER PUBLICATIONS

Second Written Opinion, PCT/US2016/067261, dated Feb. 14, 2018, 20 pages.

Shirey, R. "RFC 4949—Internet Security Glossary, Version 2," Aug. 31, 2007, XP055434424, Retrieved from the Internet: URL:https://tools.ietf.org/html/rfc4949[retrieved on Dec. 12, 2017], 365 pages.

"Butterfly Keys—Jun. 23, 2011," IP.com Journal, IP.com Inc., West Henrietta, NY, US, (2011) XP013145534, ISSN: 1533-0001, 11 pages.

"Deliverable 2.1: Security Architecture and Mechanisms for V2V/V2I", SEVECOM, pp. 1-71, XP002555811, Retrieved from the Internet:URL:http://www.sevecom.org/Deliverables/Se vecom Deliverable D2.1 v2.0.pdf (2007).

Bhavesh, N. et al., "A Protocol for Authentication with Multiple Levels of Anonymity (AMLA) in VANETs," 27 International Conference of Advanced Information Networking and Applications Workshops, 2013: 462-469: XP055105235, DOI: 10.1109/WAINA. 2013.4 ISBN: 978-0-76-954952-1.

Cooperative Vehicle-To-Vehicle Crash Avoidance Applications Using 5.9 Ghz Dedicated Short Range Communications (DSRC) Wireless Communications, IP.com Journal, IP.com Inc., West Henrietta, NY, US, (2011),72 pages, XP013144918, ISSN: 1533-0001.

International Search Report and Written Opinion, PCT/US2016/067261, dated Aug. 2, 2017, 33 pages.

Kargl F. et al., : "Secure Vehicular Communication Systems: Implementation, Performance, and Research Challenges", ARVIX. org, Cornell University Library, 7 pages (2009) XP080384750, DOI: 10.1109/MCOM.2008.4689253.

Whyte, W. et al., "A security credential management system for V2V communications,"2013 IEEE Vehicular Networking Conference, IEEE, 8 pages (2013), XP032567195, DOI: 10.1109/VNC. 2013.6737583 [retrieved on Feb. 11, 2014].

Whyte, W. et al., "A Security Credential Management System for Vehicle-to-Vehicle Communications Vehicle Safety Communications, Intelligent Transportation Systems CAMP", 33 pages, (2014), XP055366511, Retrieved from the Internet: URL:https://realworldcrypto. files.wordpress.com/2014/01/whyte.pdf [retrieved on Apr. 21, 2017].

International Report on Preliminary Patentability, dated May 2, 2018, received in international patent application No. PCT/US2016/067261.

* cited by examiner

SECURE VEHICLE COMMUNICATION SYSTEM

CROSS-REFERENCE TO RELATED APPLICATIONS

This application claims the benefit of U.S. Provisional Application 62/268,834 filed on Dec. 17, 2015.

BACKGROUND OF THE INVENTION

Numerous proposals have presented for providing wireless communications between vehicles and between a vehicle and roadside units. Examples of such proposals include the IEEE 1609 set of standards for wireless access in vehicle environments (WAVE) and the ETSI standards for intelligent transport systems. In these systems, the communications may help to enhance the safety of the vehicles, provide additional information and provide additional services. For example, the communications may help to avoid collisions, provide collision warnings, enhance traffic flow, provide navigation and route guidance, provide point of interest information and provide remote diagnostics. Numerous other uses of these communications have been proposed as well.

FIG. 1 depicts a diagram of an exemplary system 100 in which vehicles may wirelessly communicate with each other and with various off road components. Vehicles 102, 104 and 106 are positioned on a roadway and may wirelessly communicate with each other as indicated by arrows in FIG. 1. The vehicles 102, 104 and 106 may also wirelessly communicate with roadside units 110 and 112. The vehicle 106 may wirelessly communicate with a unit interfaced with a wireless telephone network 120. The wireless telephone network may include a connection to a network 122, such as the Internet, on which various servers may provide services. The roadside units 110 and 112 may also be connected to the network 122 via a gateway 114.

SUMMARY

In accordance with one exemplary embodiment, a method is practiced in a secure vehicle communication system. Credentials are stored in credential files in a storage in a vehicle. Each credential specifies a private signing key and a digital certificate. The digital certificate is valid for a specified time frame. The credential files are named to contain information regarding the specified time frame in which the credentials in the credential files are valid. A sorted index to the credential files is stored in the storage of the vehicle. The index indexes the credential files by the time frames. The index is used to retrieve the credential files for a duration wherein the credentials in the retrieved credential files are valid. One or more of the retrieved credential files may then be used in the vehicle communication system during the duration.

In accordance with another exemplary embodiment, a method is practiced in a secure vehicle communication system in which private keys are prederived in secure hardware. A local certificate manager is started and upon starting the local certificate manager, a check is made whether enough private keys for a specified period have been prederived. If enough private keys have been prederived, at least some of the prederived private keys are stored in a nonvolatile storage in a vehicle. If not enough private keys have been prederived, additional private keys are prederived and store in the non-volatile memory in the vehicle. At least one of the private keys is used in securing a communication in the secure vehicle communication system during the specified time period.

In accordance with a further exemplary embodiment, a user request to change identity is received in a secure vehicle communication system. In response to the user request, an indication is provided to the user that certificates are available for selection to realize the identity change. A selection is received from the user. A certificate identifier for the selected one of the certificates is returned to the user and a selected one of the certificates is used for the communication in a secure vehicle communication system.

In accordance with an additional exemplary embodiment, an application program interface (API) is provided for cryptographic methods in a secure vehicle communication system. The API defines an interface through which cryptographic methods can be called. The API provides an abstraction layer so that cryptographic methods may be called by using a common interface without regard to the secure hardware that is required to perform the cryptographic methods. A call is received via the API for one of the cryptographic methods. The cryptographic method that was called is invoked.

DETAILED DESCRIPTION

Figure 1:
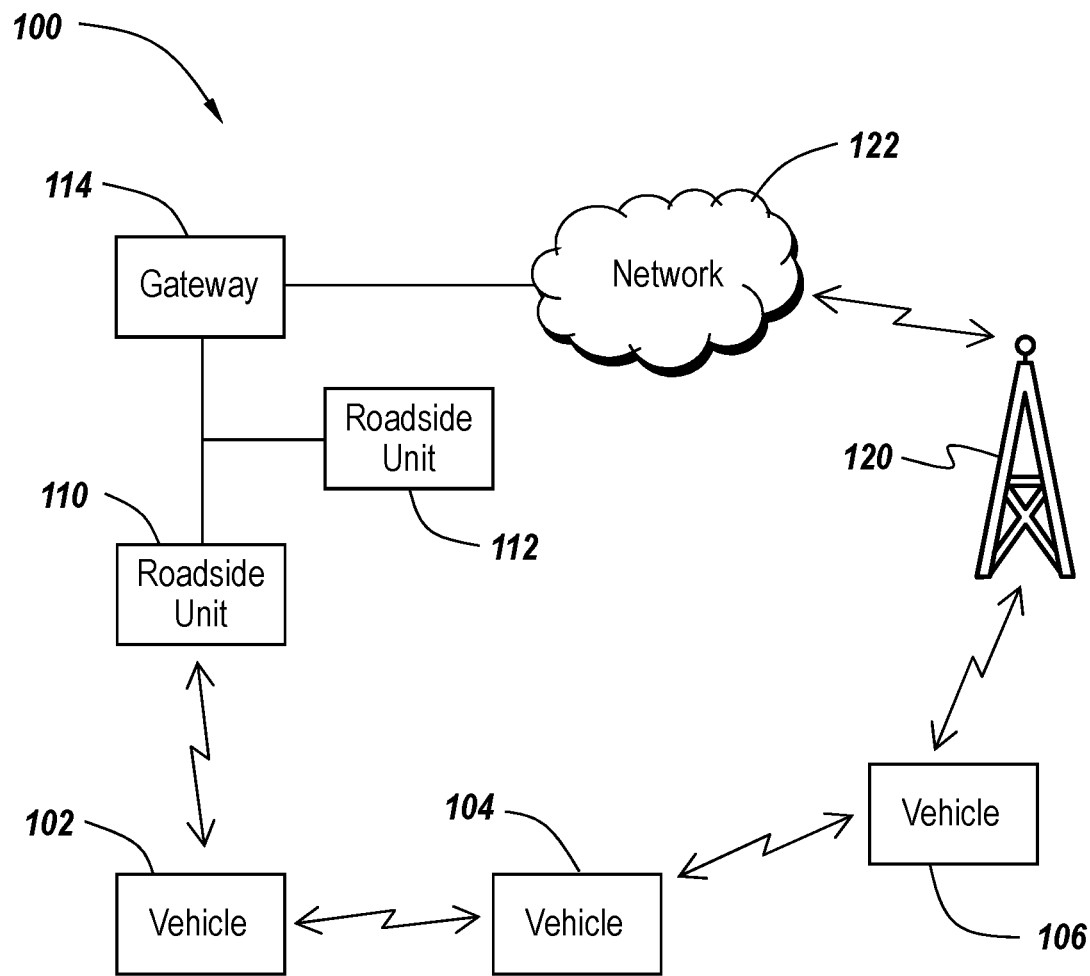
FIG. 1 shows an example of a vehicle communication system.

Exemplary embodiments herein relate to providing security and privacy in a secure vehicle communication system, such as those discussed in the Background of the Invention relative to FIG. 1. The secure vehicle communication system provided by the exemplary embodiments may conform with IEEE standard 1609.2-2016 and ETSI standards TS103097 and TS102941. The secure vehicle communication system may also conform with a Car2Car Communication Consortium basic system profile.

The security services provided by the exemplary embodiment may be performed in large part by a library of modules, such as dynamic link library modules. The exemplary embodiments may deploy an embedded system that contains the processing logic, storage and software for realizing the desired functionality. The embedded system may be resident in a vehicle or in a roadside unit. The embedded system may include secure hardware for holding private keys and performing operations on the private keys.

The exemplary embodiments described herein provide a number of optimizations and improvements that better provide security and performance for such a secure vehicle communication system.

The messages in the secure vehicle communication system should be protected against attacks, such as eavesdropping, spoofing, alteration and replay. In addition, the privacy of parties involved in the secure communication system should be protected. Personal information, identifying information and linkable information should not be leaked to unauthorized parties.

Figure 2:
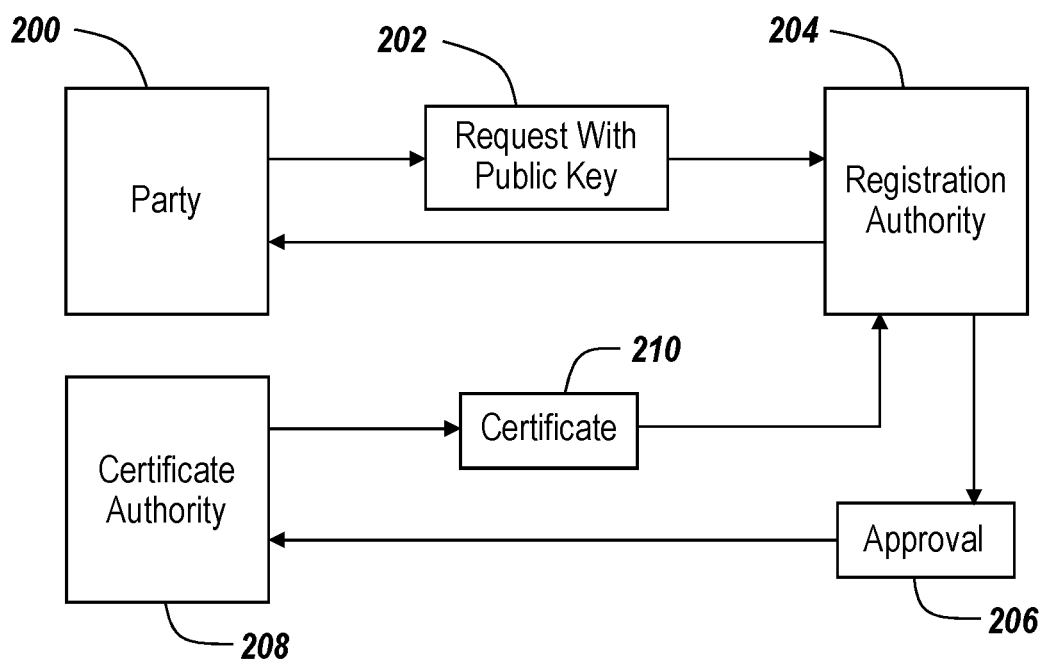
FIG. 2 shows components in an exemplary public key infrastructure (PKI) that are involved in granting a digital certificate.

The security provided by the secure vehicle communication system may rely upon a public key infrastructure (PKI). The PKI manages digital certificates and public key encryption. A key is bound to a party through a process of registration issued as certificates by a certificate authority (CA). FIG. 2 depicts interactions for a party 200 to obtain a digital certificate 210 in an exemplary U.S. based vehicle communication system. The process begins with a party 200 submitting a request 202 to a registration authority 204. The request 202 may include a public key. The registration authority 204 confirms that the party is a valid device in the system to the certificate authority 208 in the form of an approval 206. The certificate authority 208 then issues a digital certificate 210 that is passed to the registration authority 204 and back to the party 200. The digital certificate proves ownership of the pubic key. In the secure vehicle communication system, the digital certificate is a digitally signed document that binds the public key to an identity and/or a set of permissions. The flow and parties involved in a European based vehicle communication system may differ. The description in FIG. 2 is intended to be merely exemplary and not limiting.

Figure 3:
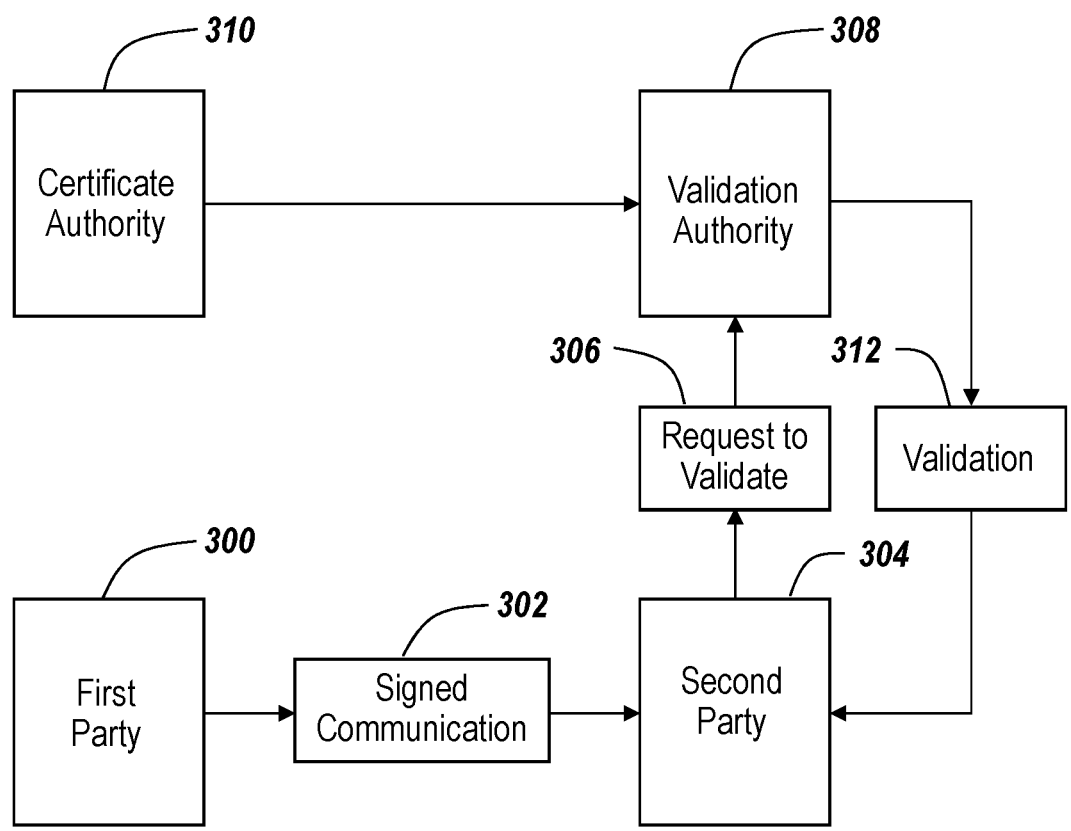
FIG. 3 shows components in a vehicle communication ecosystem involved in validating a signed communication with components.

As shown in FIG. 3, once a party has received a digital certificate, the party may use the digital certificate in communications. FIG. 3 shows a case in which a first party 300 digitally signs a communication 302 to be sent to a second party 304 with a private key. The second party 304 then verifies the signature on the signed communication 302 using the public key of the first party and validates the identity of the first party 300 by validating a digital certificate that binds the public key to the first party 300. This validation may entail submitting a validation request 306 to validation authority component 308 that returns a validation 312. The validation authority 308 likely is part of or present at the second party 304 and not a separate component. The validation component 308 may rely on information from a certificate authority 310 to validate the identity.

Figure 4:
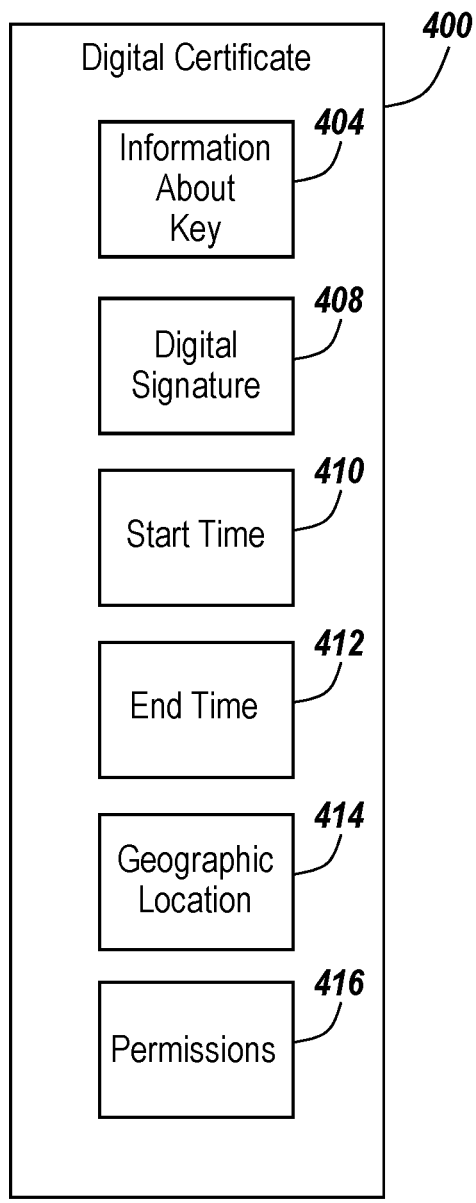
FIG. 4 depicts a number of components that may be found in a digital certificate in exemplary embodiments.

FIG. 4 shows an example of a digital certificate 400. The digital certificate may include numerous types of information stored in various fields. The digital certificate 400 may include information about a key 404. As mentioned above, the certificate binds the identity of a party or permissions to the key. This information may include the actual key or may include information that may be used to derive the key or otherwise obtain the key. The digital certificate may include a digital signature 408 that is created using a private signing key. Numerous different algorithms may be used to generate the digital signature.

Since digital certificates are only valid for specified time periods, the digital certificate 400 may include a start time 410 and an end time 412. Alternatively, a start time and a duration value may be provide or other information that identifies the period in which the digital certificate is valid. The digital certificates expire to provide enhanced security so that a party monitoring the flow of digital certificates cannot compromise the system. Lastly, the digital certificate may include geographic location information 414. The certificate may include numerous permissions 416. For instance, the permissions 416 may specify the type of messages the certificate is used with. The permissions 416 may specify what type of certificates may be issued from the certificate. Other permissions may also be specified.

Those skilled in the art will appreciate that the depiction of the digital certificate in FIG. 4 is intended to be merely illustrative and not limiting. The digital certificates may contain a different set of fields than those shown in FIG. 4 in some embodiments.

A certificate is an "explicit certificate" if the public key is explicitly given in the certificate. In contrast, a certificate is an implicit certificate if it does not contain the key but rather contains information in the form of a reconstruction value that can be used in conjunction with the issuer's public key and certificate to reconstruct the verification key using a reconstruction function. An implicit certificate does not contain a signature.

The secure vehicle communication system of the exemplary embodiments may use certificate chains. In a certificate chain, certificates are ordered from top to bottom such that each certificate in the chain is the "issuing certificate" for the one below it and is the "subordinate certificate" for the certificate above it.

A first certificate is the issuing certificate for a second certificate if the certificate holder of the first certificate used the private key of the first certificate to create the final form of the second certificate, either by signing it in the case of an explicit certificate or by creating a reconstruction value in the case of an implicit certificate. The counterpart of an issuing certificate is a subordinate certificate.

Figure 5:
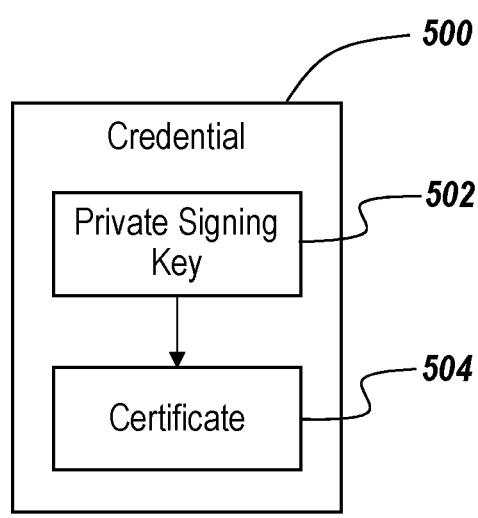
FIG. 5 depicts some of the components found in a credential in exemplary embodiments.

Exemplary embodiments described herein may employ the notion of a credential. As shown in FIG. 5, a credential 500 includes a private signing key 502 and a digital certificate 504.

The credentials are used in securing communications in the secure communication system in exemplary embodiments. The private signing key are used to digitally sign communications, and the certificates are used to bind a public key to an identity and/or to a set of permissions. A certificate certifies that a public key is authentic for a device in the system.

One or more local certificate managers (LCMs) may be present in the system to manage identity changes and certificates used for digital signatures. The LCM selects and provides the correct certificate for signing an outgoing message.

Each application may open a security context. The security context chooses one or more LCM's that may be used for the application. The security context defines the security properties for the application.

Figure 6:
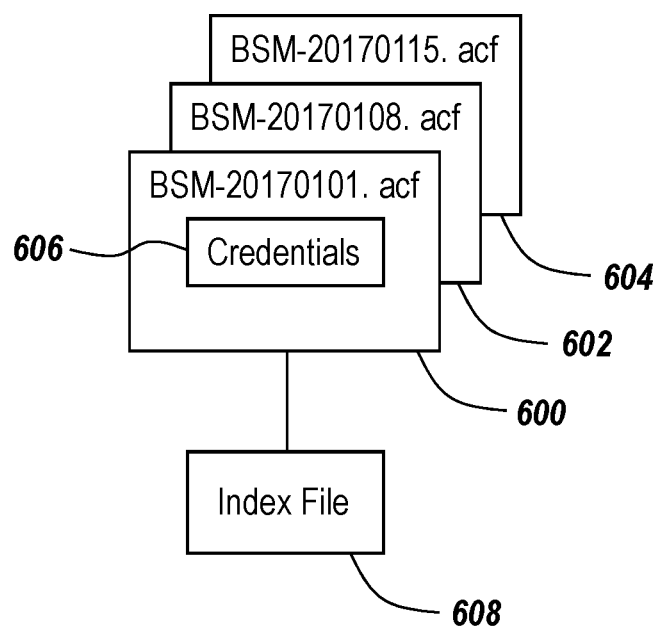
FIG. 6 depicts an index file and credential files holding credentials that are indexed by the index file.

In exemplary embodiments, multiple credentials are available and valid during a specified time window. For example, credentials may be valid for the duration of a week for some sets of credentials. Those skilled in the art will appreciate that the duration of validity of the credentials may vary. In the exemplary embodiments, credentials that are valid for a specified time window may be stored within a common file, and these files may be indexed by a sortable index. As shown in FIG. 6, credential files 600, 602 and 604 hold respective credentials. For example, credential file 600 holds credential 606. These credential files are indexed by an index file 608. The indexing helps to quickly locate the credentials that are needed for a specified time period. Each of the credential files 600, 602 and 604 has a name that includes a start time at which the credentials stored in the file are valid and these names are used to sort the credential files and generate the assorted index files 608 as will be described in more detail below.

Some exemplary embodiments may use a credential file format designated as the Aerolink Credential File (ACF) format. The details of this file format are set forth below.

The ACF format provides a standard format for credentials for internal use within the secure vehicle communication system. The single format is consistent and easy to use internally. Credential information may be initially received in a different format but is stored internally in the ACF format.

The credential for a private key may not be predetermined. The credential for the private key may reside either in the ACF or in an hardware security module (HSM). Each credential may use data to calculate its associated private key given a common base, for example, by using a caterpillar signing key common to all credentials, butterfly indices, and/or private reconstruction values per credential.

A seed value for generating the private key may be provided in the ACF or may reside in a HSM. A public/private key pair may be used as an input to generate another public/private key pair. For example, when generating a request for an implicit certificate, a seed key may be used to derive the final public key. In the butterfly keys model, for example, the seed key may be expanded into an encryption key and/or in to an intermediate signing key using an expansion function. The ACF itself, however, may not be encrypted.

In using the ACF, one or more validity periods in a single file may be allowed. In addition, the ACF format may allow one or more certificates per validity period. The ACF format may allow an actual private key, a reference to a private key, and/or data to calculate a private key. The ACF format may allow different types of private-key references. The ACF format may allow access to the credentials for any specified start time.

Certificates and keys grouped in the ACF format may have the same validity duration. Certificates and keys grouped in the ACF format may have the same types and number of private keys. As a result, these conditions may simplify implementation and may simplify searching for a file by having a fixed record size.

The ACF format may have file name with a prefix of one or more characters followed by a hyphen. The ACF format may have a filename with an "acf" extension. The ACF format may have, following the prefix, the date of the earliest start time of any certificate in the file, expressed as YYYYMMDD, where YYYY is the 4-digit year, MM is the 2-digit month, and DD is the 2-digit date of the month. For example, 20140616 may represent 16 Jun. 2014.

Each ACF may represent its credentials using information contained in a header, and/or unique information and/or individual information contained in a set of records, wherein there may be one record per credential.

The header for ACF format may contain a character string identifying it as an ACF file. The header for ACF format may contain an ACF format version number. The header for ACF format may contain an indicator of the message protocol that the contents follow, for example, an IEEE or ETSI message protocol. The header for ACF format may contain a type of signing key, for example, a plaintext or index into the HSM. The header for ACF format may contain the length of the butterfly indices in each record. The length may be 0 and/or 1 if only one data element is present, for example, the j element, or 3 if two data elements are present, for example, both the $j^{th}$ and $i^{th}$ elements.

The header for ACF format may contain the length of the private reconstruction value in each record. The header for ACF format may contain the length of signing-key information in each record. The header for ACF format may contain the type of decryption key. The header for ACF format may contain the length of decryption-key information in each record. The header for ACF format may contain the length of the certificate in each record. The header for ACF format may contain the earliest start time of any record. The start time for each record may fall during the day specified in the filename.

The header for ACF format may contain the time interval in seconds between consecutive start times of certificates or groups of certificates, for example, the duration of a record not including any overlap period. The time interval, however, may not be 0 seconds. If there is only a single certificate or group, the time interval may be the duration of the certificate.

The header for ACF format may contain the number of records which are valid simultaneously. The records may share the same start time. The header for ACF format may contain the number of records in the file. The header for ACF format may contain the length of the caterpillar signing-key information.

The header for ACF format may contain the caterpillar signing-key information. The caterpillar signing-key information may not be present if the length of the caterpillar signing-key information length is zero. The header for ACF format may contain the length of the Advanced Encryption Standard (AES) key for caterpillar signing-key expansion. The header for ACF format may contain the AES key for caterpillar signing-key expansion. The AES key may not be present if length of the AES key for caterpillar signing-key expansion length is zero.

The format version numbering may start with 1. For each revision resulting in a backward-incompatible version, the format version may be incremented.

If a signing key is not present, the type of signing key may be indicated. If the signing key is not present, the length of the signing key may be 0. If a decryption key is not present, the type of decryption key may be indicated. If the decryption key is not present, the length of the decryption key may be 0.

An ACF may contain, following the ACF header, the number of records indicated in the header. An ACF may contain at least one record. The records in an ACF may be ordered by ascending certificate start times, beginning with the first start time indicated in the header. Each record in an ACF may contain one certificate and information for at least one private key, for example, the key itself, a reference to the key, and/or information to calculate the key. Each record in an ACF may contain the same types and number of private keys. Each record in an ACF may have the same size certificate. Each record in an ACF may have the same validity duration. The validity duration may be specified in fields in the certificate.

When a plurality of ACFs are used to hold records, which in total may span multiple days, the records that are valid at the same time, but excluding any overlap period, may exist in the same file. Each ACF may begin with the ACF header with ordered fields.

The ACF may use a specific file structure. The file structures may be a representation to list and order the fields in the ACF, but only the bytes of the fields are in the ACF. As a result, the ACF does not contain any padding or other additional information.

The message protocol type for the ACF may be represented as follows:

typedef uint8_t MsgProtocol;
MsgProtocol const IEEE16092_D9_3=0;
MsgProtocol const ETSI103097_v1_1_1=1;
MsgProtocol const ETSI103097_v1_1_15=2;
MsgProtocol const IEEE16092_v3=3;

The private-key type for the ACF may be represented as follows:

```
typedef uint8_t PrivKeyType;
PrivKeyType const PrivKeyEncoding_Invalid = 0; // invalid (none)
PrivKeyType const PrivKeyEncoding_Plaintext = 1; // private key is
in the record
PrivKeyType const PrivKeyEncoding_NXP_SMX = 2; // private
key is in NXP's SMX
PrivKeyType const PrivKeyEncoding_NXP_SMX2 = 3;   // private
key is in NXP's SMX2
PrivKeyType const PrivKeyEncoding_Craton = 4; // private key
is in Autotalks Craton
PrivKeyType const PrivKeyEncoding_REL_V2X = 5; // private key
is in Renesas V2X hardware
```

The content of the butterfly indices the ACF may depend on the length of the field, which can be 0, 1, or 3. If the length is 0, there are no butterfly indices.

```
butterflyIndices[1] = {
    uint8_t  j; }          // index of a simultaneously valid credential
butterflyIndices[3] = {
    uint8_t j;             // index of a simultaneously valid credential
    uint8_t i[2]; } // value identifying the week the credential is valid
```

The header for a ACF may contain one or more fields as follows:

```
typedef stuct {
    uint8_t   acfId[4];                    // ACF identifier ("acf")
    uint8_t   fileformatVersion;           // file format version number (3)
    MsgProtocol messageProtocol;           // message protocol of records
    PrivKeyType signingKeyType;            // type of signing key
    uint8_t   butterflyIndicesLen;         // no. of bytes in the butterfly
                                           // indices in each record (0, 1, or 3)
    uint8_t   privateReconValLen;          // no. of bytes in the private reconstruction
value in each record
    uint8_t   signingKeyInfoLen;           // no. of bytes in the signing-key information
in each record
    PrivKeyType decryptionKeyType;         // type of decryption key
    uint8_t   decryptionKeyInfoLen;        // no. of bytes in the decryption-key
information in each record
    uint8_t   certificateLen[2];           // no. of bytes in a certificate, big endian
    uint8_t   startTime[4];                // start time of first record, Time32, big endian
    uint8_t   startInterval[4];            // time between consecutive start times in
seconds, big endian
    uint8_t   numSimultaneous;             // no. of simultaneously valid credentials
    uint8_t   numRecords[4];               // no. of credential records in the file, big
endian
    uint8_t   catSigningKeyInfoLen;        // no. of bytes in the caterpillar signing-key
information
    uint8_t   catSigningKeyInfo[catSigningKeyInfoLen];   // caterpillar signing-
key information
    uint8_t   aesKeyLen;                   // no. of bytes in the AES key for signing-
key expansion
    uint8_t   aesKey[aesKeyLen];           // AES key for signing-key expansion
} AcfHeader;
```

The record format in a ACF may contain one or more fields as follows:

```
typedef struct {
    uint8_t butterflyIndices[butterflyIndicesLen];   // butterfly indices
    uint8_t privateReconVal[privateReconValLen];     // private reconstruction value
    uint8_t signingKeyInfo[signingKeyInfoLen];       // signing key information,
big endian
    uint8_t decryptionKeyInfo[decryptionKeyInfoLen;  // decryption key
information, big endian
    uint8_t certificate[certificateLen];             // certificate
} AcfRecord;
```

The ACF format may contain fields as follows:
```
typedef struct {
    AcfHeader header;  // header
    AcfRecord records[numRecords]; // records
} AcfFile;
```

The ACF may contain preloaded an anonymous credential for use with operating vehicles in the United States. The credentials may be generated from a caterpillar key. There may be up to 20 credentials valid simultaneously per week. The private keys may be protected using the NXP SMX2. As a result, the ACF header may comprise the following values:
  acfId="acf"
  fileFormatVersion=3
  messageProtocol=IEEE_16092_2013
  signingKeyType=PrivKeyEncoding_NXP_SMX2 (applies to the caterpillar signing key)
  butterflyIndicesLen=1 (because the i index is in the implicit certificate, so only j is required)
  privReconValLen=32 (because U.S. anonymous certificates are implicit and use ECDSA-NIST-P256)
  signingKeyInfoLen=0 (because the actual signing key is not in this ACF or in the SMX2)
  decryptionKeyType=PrivKeyEncoding_Invalid (because anonymous certificates don't have encryption keys)
  decryptionKeyInfoLen=0 (because anonymous certificates don't have encryption keys)
  certificateLen=no. of bytes in the anonymous certificate in each record
  startTime=Time32 encoding of the start time of the first 20 certificates
  startInterval=604800 (one week, expressed in seconds)
  numSimultaneous=20 (because there are 20 certificates valid simultaneously)
  numRecords=20n, where n is the number of weeks of credentials in this ACF
  catSigningKeyInfoLen=no. of bytes to represent the index in the SMX2 for the slot holding the caterpillar signing key
  catSigningKeyInfo=the index in the SMX2 for the slot holding the caterpillar signing key
  aesKeyLen=16 (for AES-128)
  aesKey[16]=the AES key for expanding the caterpillar signing key
  Each of the 20n records may contain:
  butterflyIndices[1]=the j index identifying the credential in the set of simultaneously valid credentials,
  privateReconVal[32]=the private reconstruction value for this credential,
  certificate[certificateLen]=the implicit anonymous certificate for this credential.

The ACF may contain preloaded an anonymous credential for use with operating vehicles in the European Union. The credentials may be generated from a caterpillar key. There may up to 20 credentials valid simultaneously per week. The private keys may be protected using the NXP SMX2. As a result, the ACF header may comprise the following values:
  acfId="acf"
  fileFormatVersion=3
  messageProtocol=ETSI_103097_v1_1_15
  signingKeyType=PrivKeyEncoding_NXP_SMX2 (applies to the caterpillar signing key)
  butterflyIndicesLen=3 (because these are not found in the anonymous explicit certificate)
  privReconValLen=0 (because E.U. anonymous certificates are explicit)
  signingKeyInfoLen=0 (because the actual signing key is not in this ACF or in the SMX2)
  decryptionKeyType=PrivKeyEncoding_Invalid (because anonymous certificates don't have encryption keys)
  decryptionKeyInfoLen=0 (because anonymous certificates don't have encryption keys)
  certificateLen=no. of bytes in the anonymous certificate in each record
  startTime=Time32 encoding of the start time of the 20 certificates
  startInterval=604800 (one week, expressed in seconds)
  numSimultaneous=20 (because there are 20 certificates valid simultaneously)
  numRecords=20n, where n is the number of weeks of credentials in this ACF
  catSigningKeyInfoLen=no. of bytes to represent the index in the SMX2 for the slot holding the caterpillar signing key
  catSigningKeyInfo=the index in the SMX2 for the slot holding the caterpillar signing key
  aesKeyLen=16 (for AES-128)
  aesKey[16]=the AES key for expanding the caterpillar signing key
  Each of the 20n records may contain:
  butterflyIndices[3]=the j index identifying the credential in the set of simultaneously valid credentials followed by the i index identifying the week the credential is valid, and
  certificate[certificateLen]=the explicit anonymous certificate for this credential.

Credentials can be switched upon expiration of the credentials. As was mentioned above, the credentials may be valid for a duration, such as one week at a time. Once the credentials expire, new credentials must be obtained for use.

One optimization provided by exemplary embodiments is to index the credential files so that the credentials need not be indexed each time that the system is initialized. Certain vehicle manufacturers may wish to preload the vehicle with all of the credentials needed for the anticipated lifetime of the vehicle or a significant portion of the lifetime of the vehicle. Since this constitutes a great number of credentials, it could be time consuming to locate and grab all of the credentials for a given time window. The exemplary embodiments provide an approach to efficiently access the credential files in a fashion that consumes substantially less time.

Figure 7:
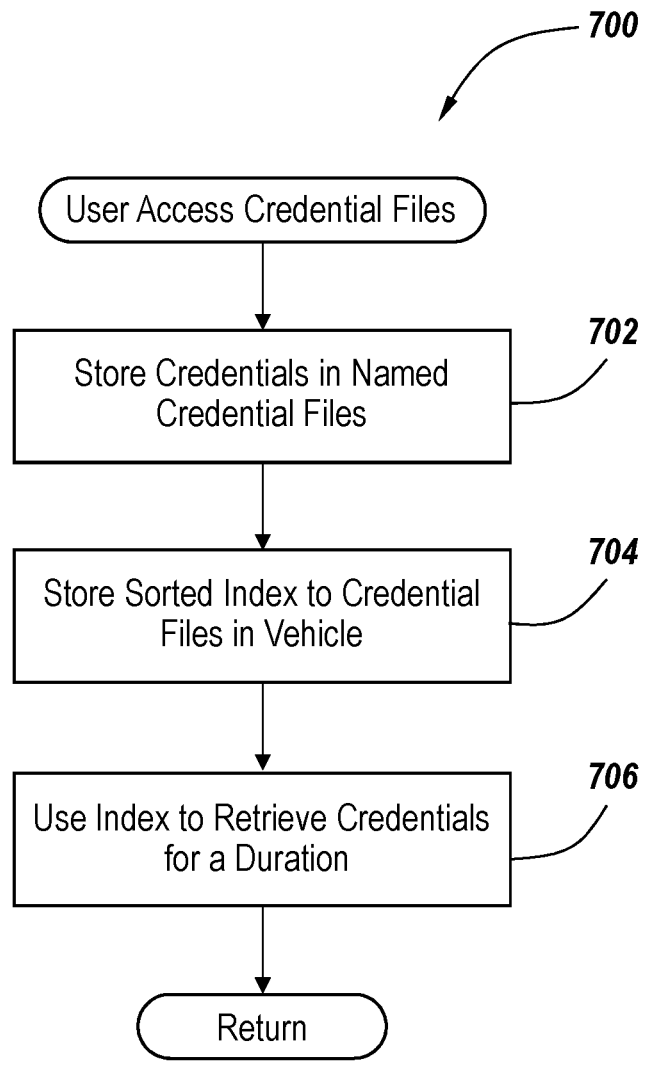
FIG. 7 is a flowchart illustrating steps that are performed to access preloaded credential files.

FIG. 7 is a flowchart 700 of the steps that are performed to index the credential files for a given LCM. Initially, credentials are stored in named credential file (step 702). As was explained above, the names of the credential files may include the date at which the credential file either is active or expires, for example. An index to the credential files is provided so they are easily able to locate all of the credential files for a given duration. In particular, the credentials are sorted by the start time at which they are valid and a chronological index to the credential files is created and stored in the vehicle (step 704). When new credentials are needed, the index is used to retrieve the credential for a given duration (step 706). At least one of the credential files is retrieved.

Exemplary embodiments may also provide another optimization by prederiving keys so that there is no need to derive the keys on demand. The derivation of keys may be time consuming, and thus it may result in significant latency when deriving the keys on demand.

Figure 8:
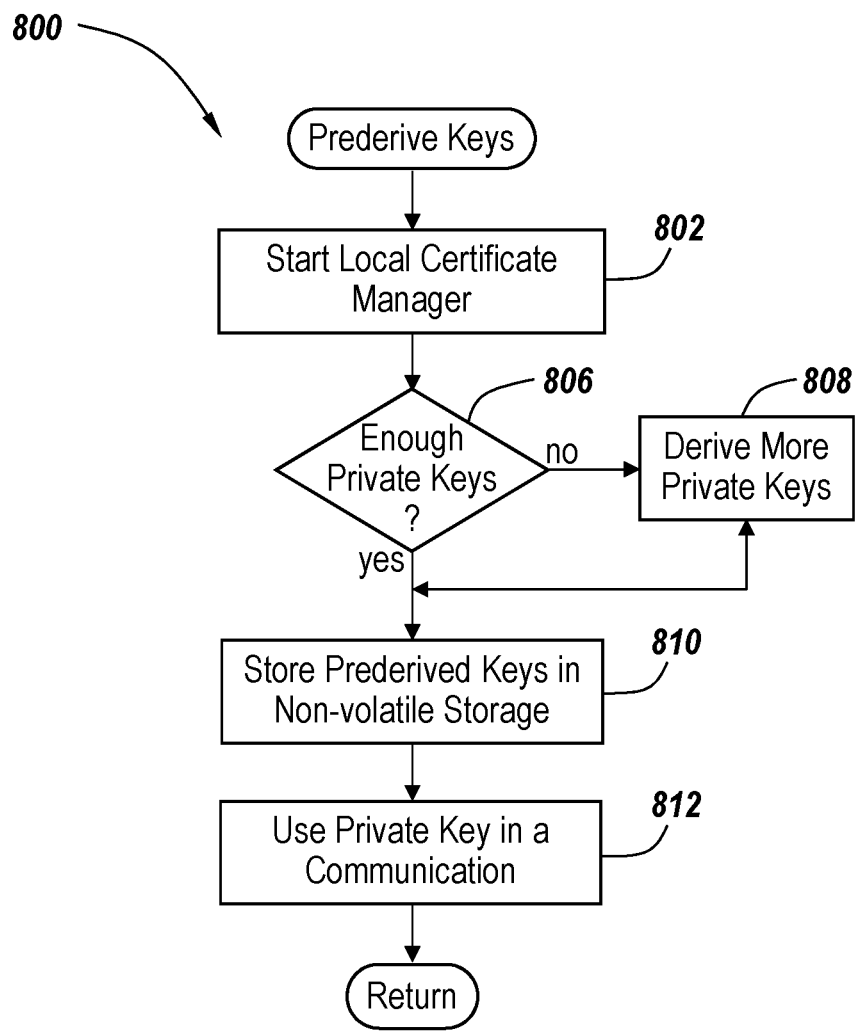
FIG. 8 is a flowchart illustrating steps that are performed to prederive keys.

As shown in FIG. 8, when a local certificate manager is started for the secure vehicle communication system (step 802), a check is made whether there are enough private keys (step 806). If there are not, more private keys must be derived (step 808). The keys are preferably derived in secure hardware (e.g. an HSM) so as to eliminate the possibility of an interloper gaining access to the keys or other secure information. Those skilled in the art will appreciate that there may be a number of different algorithms and approaches to deriving the keys. The private keys may be derived, for example, using butterfly keys. If there are enough private keys, the prederived keys are stored in a nonvolatile storage for use by the secure vehicle communication system (step 810). These private keys that have been used in a communication as needed (step 812).

Figure 9:
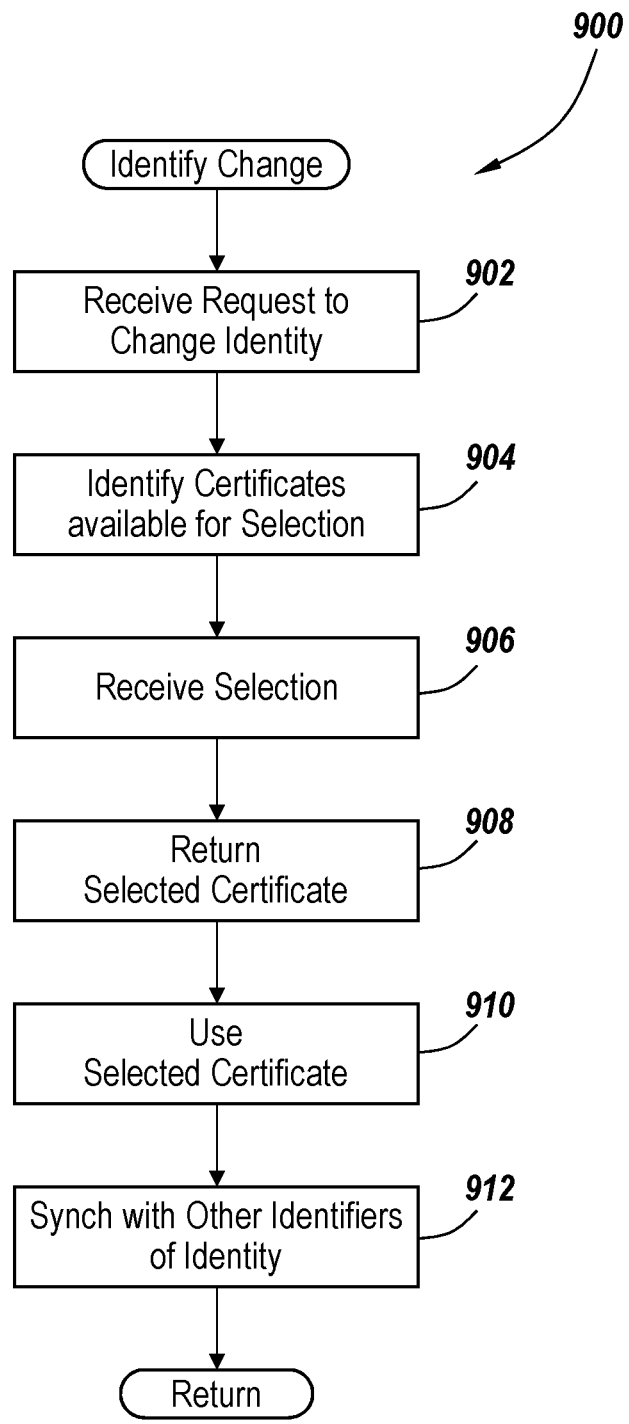
FIG. 9 is a flowchart illustrating steps that are performed to perform an identity change.

In order to enhance privacy of the secure vehicle communication system, it is desirable to change the identity of the party on an ongoing basis. FIG. 9 provides a flowchart 900 of the steps that may be formed to realize the identity change. Initially, a request is received to change identity (step 902). This request may be at the behest of a party or may be enforced by the system at specified times or upon certain events. The vehicle communication system then identifies what digital certificates are available for selection to realize the new identity of the party (step 904). A selection is received (step 906) and the selected certificate is returned or an identifier to the selected certificate is returned (step 908). This selected certificate is then used in place of the prior certificate. This changing of certificates acts as a synchronization point and may be synched with changing other identifiers of identity (such as a MAC address) so that those identifiers may also be updated at the same time (step 912).

It is desirable to provide an abstraction layer for internal use with the libraries that provide the cryptographic functionality. The exemplary embodiments provide an application program interface (API) that serves as a hardware abstraction layer. The security hardware may be from different vendors with different interfaces. This API allows the functions and function call signatures to be uniform for internal use. Code for realizing the specific functions may be tailored to the particular secure hardware device involved. As will be described in more detail below, the secure hardware may be provided, for example, to protect private keys and/or to accelerate verification.

Figure 10:
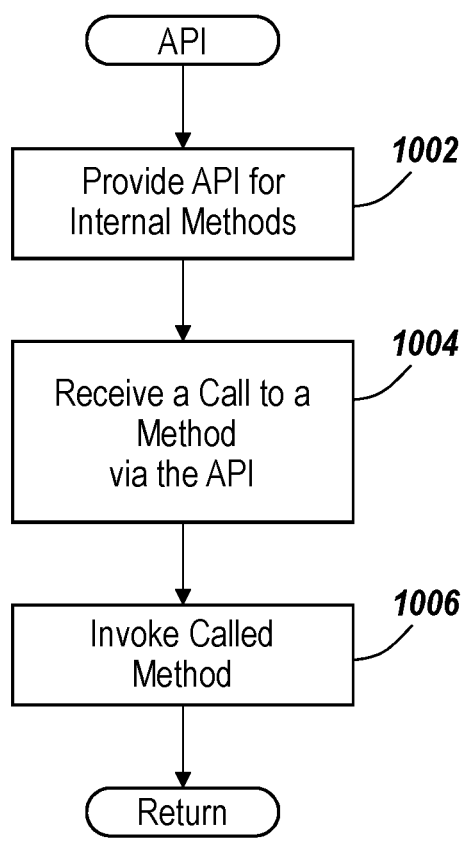
FIG. 10 is a flowchart illustrating use of an API in exemplary embodiments.

FIG. 10 depicts a flowchart 1000 of the use of such an API in exemplary embodiments. An API is provided for cryptographic methods provided in a security library of methods (step 1002). A call for a method is received and is made via the API (step 1004). The appropriate method is invoked in (step 1006). The method may be any of a number of different methods detailed below, for example.

In exemplary embodiments, the API may support a number of different types of objects that have associated methods. One such object is a public key object having methods and attributes associated with a public key. The object may hold the public key. There may be a method for encrypting using the public key. These may be a method for deriving a public key from an implicit certificate. There may be a method for signature verification.

There may also be a private key object for holding attributes and methods associated with a private key. The object may hold a private key. The methods may include a decrypt method for decrypting ciphertext and a signature method for taking data and returning a digital signature. The methods may include a method for creating a private key when implicit certificates are used and a method for deriving a private key based on butterfly keys.

There may also be a symmetric key object that produces ciphertexts of plaintext. Using the Advanced Encryption Standard (AES), which is a symmetric encryption algorithm. There may be corresponding decrypt method for decrypting ciphertext to produce plaintext.

A hash object may be provided for an associated hash algorithm. Methods may be provided for receiving the content that is to be hashed and produce a hash of the contents.

Figure 11:
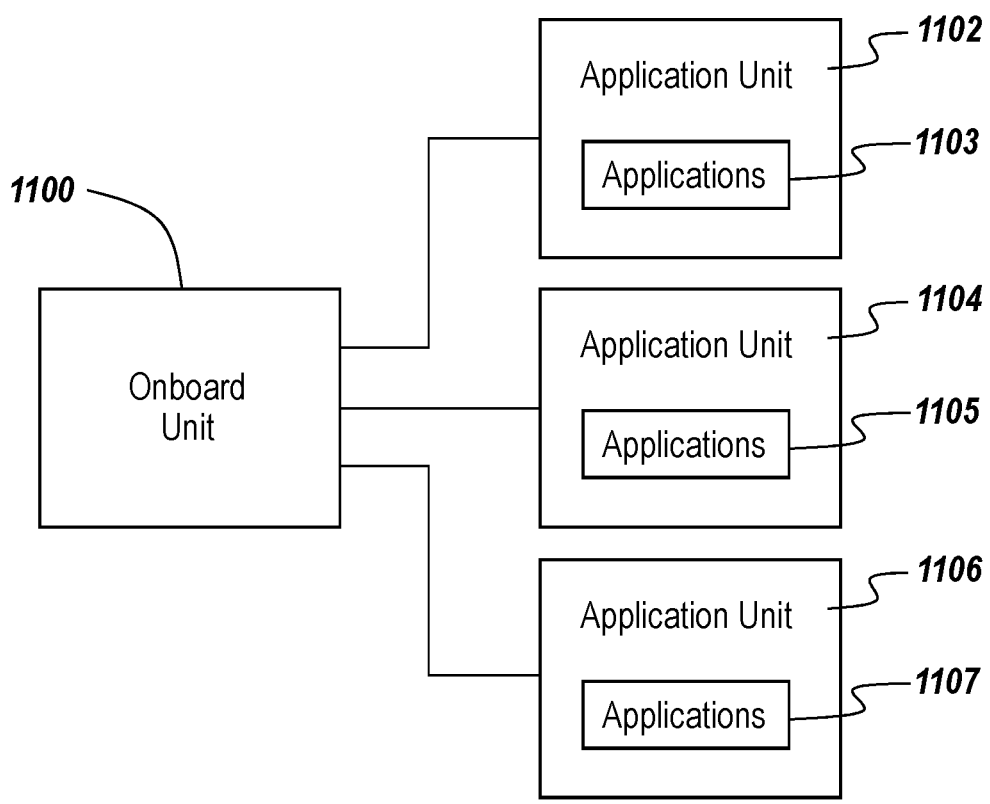
FIG. 11 depicts an onboard unit and various application units in a vehicle in exemplary embodiments.

FIG. 11 shows an example of the organization of the secure vehicle communication system in exemplary embodiments. The system depicted in FIG. 11 is for a single vehicle or a single roadside unit. The vehicle or roadside unit includes an onboard unit 1100 that is responsible for wirelessly communicating with other vehicles, roadside units and the like. In addition, the onboard unit 1100 is responsible for performing other functionalities such as providing services to applications. The onboard unit 1100 may interact with a number of application units 1102, 1104 and 1106. Each application unit is responsible for executing one or more applications 1103, 1105 and 1107, respectively. The applications 1103, 1105 and 1107 may be executed on a common processor, and the processor may be part of the onboard unit 1100.

Figure 12:
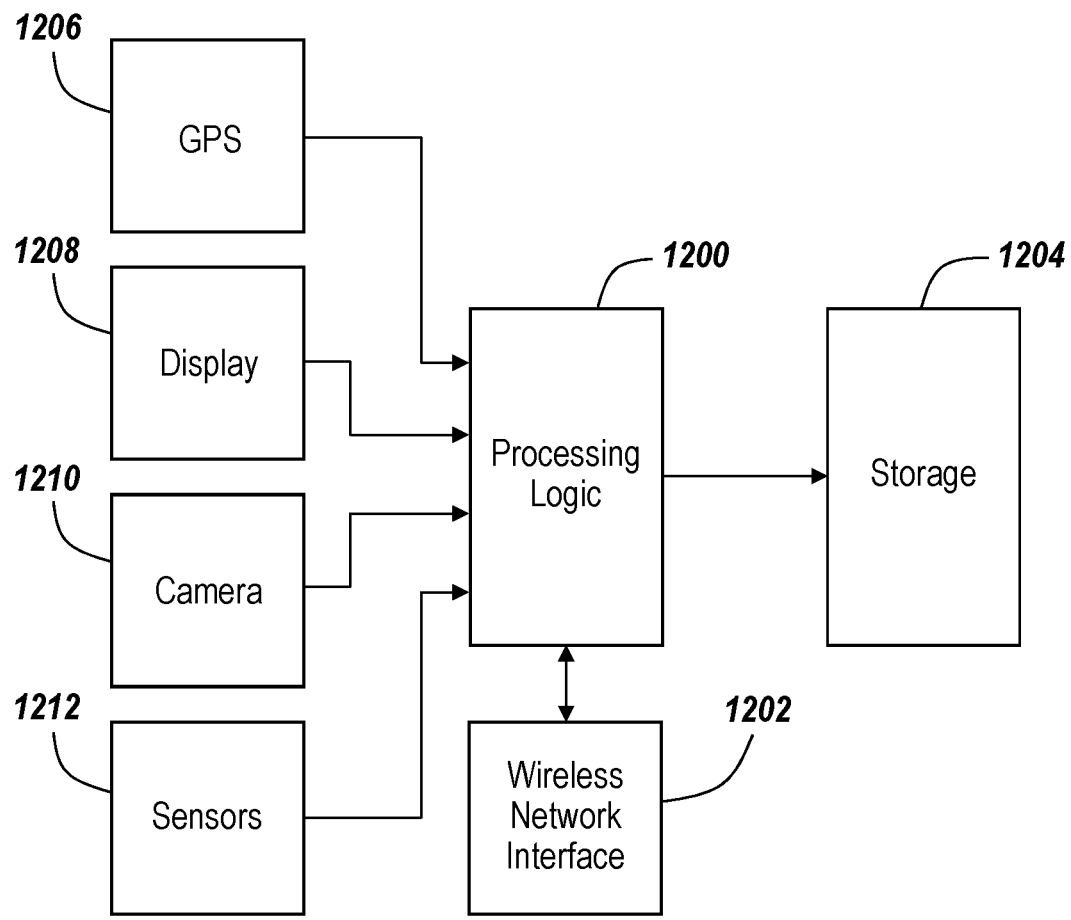
FIG. 12 depicts exemplary components that may be found in an onboard unit in exemplary embodiments.
Figure 13:
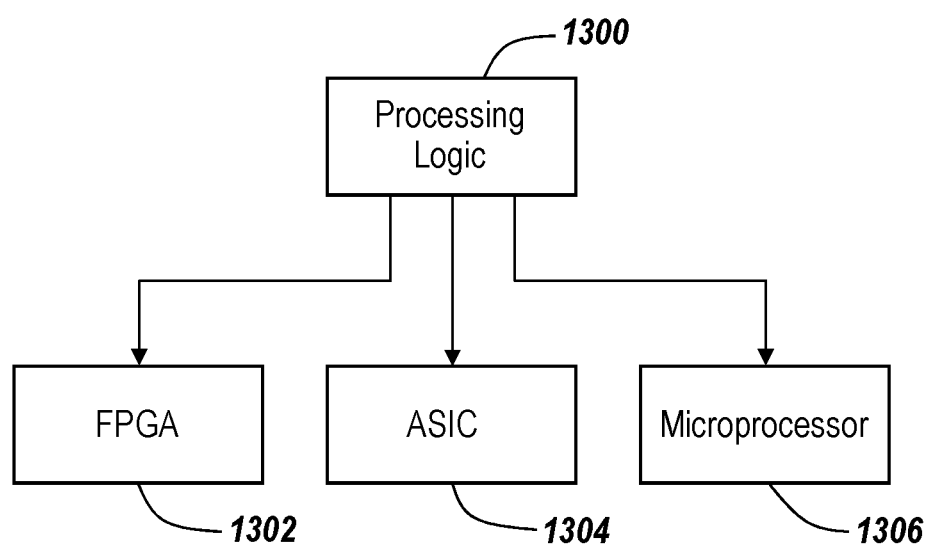
FIG. 13 illustrates a number of different possibilities for a processing logic 1300 for the processing logic in exemplary embodiments.

FIG. 12 illustrates in more detail some of the components found in the onboard unit 1100 as well as some peripheral devices that may communicate with the onboard unit 1100 when present in a vehicle. As shown in FIG. 12, processing logic 1200 may be provided to provide processing capability for the onboard unit. The processing logic 1200 may have access to storage 1204. The processing logic 1200 may be similar for a roadside unit. The storage may take a variety of different formats, including nonvolatile storage, solid state storage, storage on a computer readable medium and the like. The processing logic 1200 may be coupled to a wireless network interface 1202. The wireless network interface 1202 may provide the ability to communicate with a wireless network such as an 802.11P network. The processing logic may also be interfaced with a number of peripheral devices including a global positioning system (GPS) transceiver 1206, a video display 1208, a camera 2010 and sensors 1212.

The processing logic may take many different forms. For example, the processing logic 1300 may include a field programmable gate array (FPGA) 1302, an application specific integrated circuit (ASIC) 1304 and/or a microprocessor 1306. The processing logic may be found, for example, on an embedded system that realizes the onboard unit functionality.

Figure 14:
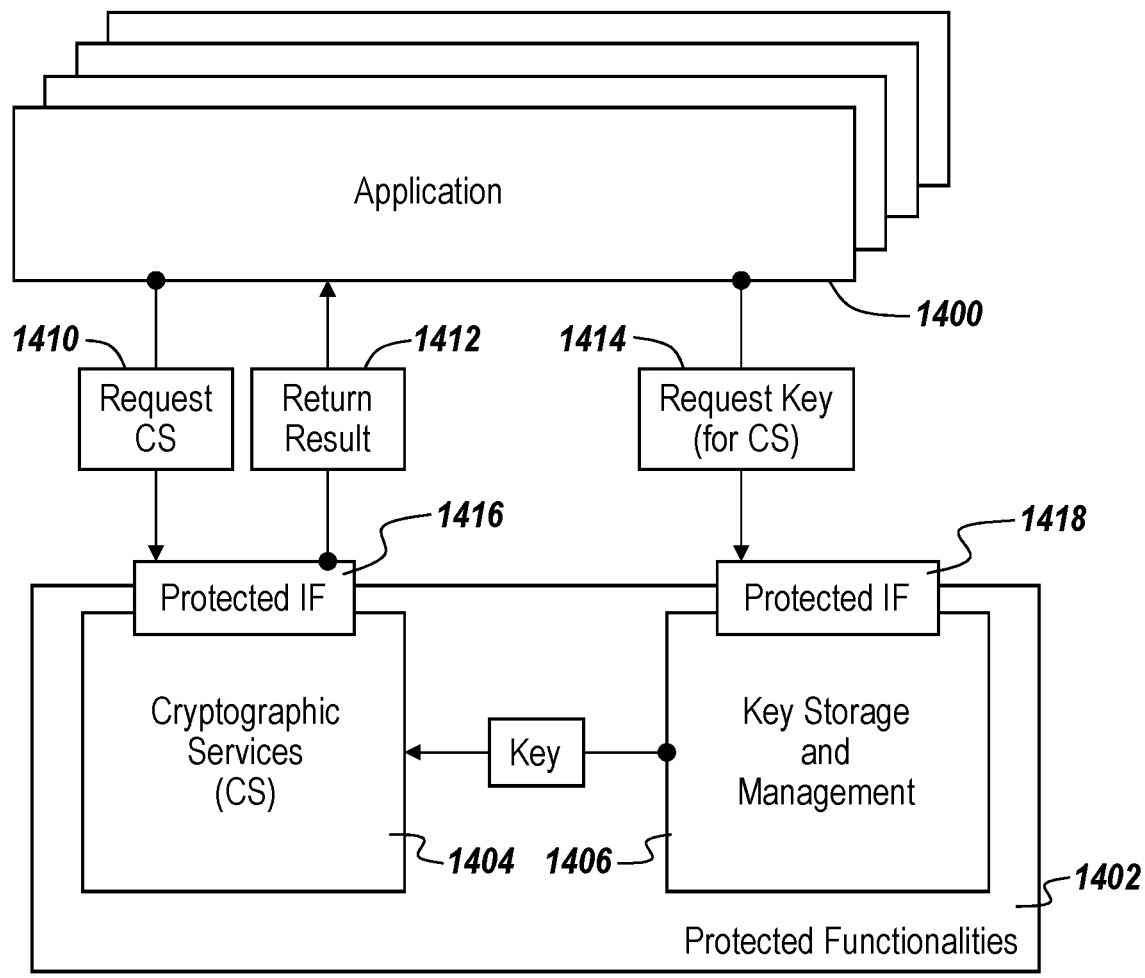
FIG. 14 illustrates interactions between applications and protected functionalities in exemplary embodiments.

FIG. 14 depicts the interaction between application 1400 and the protected functionalities that are provided as part of the security for the secure vehicle communication system. The protected functionalities 1402 include cryptographic services 1404 and key storage and management 1406. The cryptographic services perform cryptographic methods, such as encryption, decryption, digital signatures and the like. The key storage and management 1406 is provided to store keys that are used for the cryptographic services and to manage such keys. A protected interface 1416 is provided for the cryptographic service and another protected interface 1418 is provided for the key storage management. These may be stored, for instance, in secure hardware. The secure hardware may be used to store the private keys and to perform private key operations. The secure hardware may include both storage and processing hardware. The secure hardware may be physically secured and may be designed to prevent monitoring and tampering.

When one of the applications 1400 desires cryptographic services, the application sends a request for cryptographic services 1410 to the cryptographic services 1404 via the protected interface 1416. If the cryptographic services need a key, the key is obtained from the key storage and management 1406. The cryptographic services use the key as needed and return the result 1412 to the application 1400 via the protected interface 1416. In some cases, the requests may be encrypted and require a key that is sent from the application 1400 via the protect interface 1418 to the key storage and management 1406.

While the present invention has been described with reference to exemplary embodiments herein, those skilled in the art will appreciate that various changes in form and detail may be made without departing from the intended scope of the present invention as defined by the claims that follow.

What is claimed is:

1. A method for use in a secure vehicle communication system comprising:
   storing credentials in credential files in a storage in a vehicle, wherein each credential includes a digital certificate and at least one of a private key, a reference to a private key, data to calculate a private key, or combinations thereof and is valid for a specified time frame;
   for each credential file, naming the credential file to include a date indicating a start time of a credential in the credential file;
   sorting the credential files by the specified time frames that the credentials in the credential files are valid;
   storing an index to the credential files in the storage of the vehicle, wherein the index indexes the credential files by the specified time frames that the credentials stored in the credential files are valid;
   using the index to retrieve the credential files for a duration, wherein the credentials in the retrieved credential files are valid in the duration; and
   using at least one of the retrieved credential files in the vehicle communication system during the duration.

2. The method of claim 1 wherein the sorting uses the names of the credential files to sort.

3. The method of claim 2, further comprising:
   creating the index to index the sorted credential files.

4. The method of claim 1, wherein the step of storing credentials further comprises storing the credentials for an anticipated lifetime of a vehicle or a significant portion of the anticipated lifetime of the vehicle in the credential files in the storage in the vehicle.

5. A non-transitory computer-readable storage medium holding instructions that when executed by processing logic perform the following:
   storing credentials in credential files in a storage in a vehicle, wherein each credential includes a digital certificate and at least one of a private key, a reference to a private key, data to calculate a private key, or combinations thereof and is valid for a specified time frame;
   for each credential file, naming the credential file to include a date indicating a start time of a credential in the credential file;
   sorting the credential files by the specified time frames that the credentials in the credential files are valid;
   storing an index to the credential files in the storage of the vehicle, wherein the index indexes the credential files by the specified time frames that the credentials stored in the credential files are valid;
   using the index to retrieve the credential files for a duration, wherein the credentials in the retrieved credential files are valid in the duration; and
   using at least one of the retrieved credential files in the vehicle communication system during the duration.

6. The non-transitory computer-readable medium of claim 5, further holding instructions that when executed by processing logic perform the following:
   storing the credentials for an anticipated lifetime of a vehicle or a significant portion of the anticipated lifetime of the vehicle in the credential files in the storage in the vehicle.

* * * * *